US011280049B2

(12) United States Patent
Tsuruhara et al.

(10) Patent No.: US 11,280,049 B2
(45) Date of Patent: Mar. 22, 2022

(54) GAS BARRIER LAMINATE AND METHOD FOR PRODUCING SAME

(71) Applicant: OJI HOLDINGS CORPORATION, Tokyo (JP)

(72) Inventors: Masahiro Tsuruhara, Tokyo (JP); Tomofumi Isozaki, Tokyo (JP); Yasutomo Noishiki, Tokyo (JP); Yuta Shamoto, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 17/277,882

(22) PCT Filed: Oct. 10, 2019

(86) PCT No.: PCT/JP2019/040106
§ 371 (c)(1),
(2) Date: Mar. 19, 2021

(87) PCT Pub. No.: WO2020/085110
PCT Pub. Date: Apr. 30, 2020

(65) Prior Publication Data
US 2021/0310194 A1    Oct. 7, 2021

(30) Foreign Application Priority Data

Oct. 26, 2018 (JP) .............................. JP2018-202291
Oct. 26, 2018 (JP) .............................. JP2018-202300
Mar. 1, 2019 (JP) .............................. JP2019-037164

(51) Int. Cl.
*D21H 19/82* (2006.01)
*D21H 19/40* (2006.01)
*D21H 19/60* (2006.01)
*D21H 21/52* (2006.01)
*D21H 27/10* (2006.01)

(52) U.S. Cl.
CPC ............ *D21H 19/82* (2013.01); *D21H 19/40* (2013.01); *D21H 19/60* (2013.01); *D21H 21/52* (2013.01); *D21H 27/10* (2013.01)

(58) Field of Classification Search
CPC ........ D21H 19/82; D21H 19/40; D21H 19/60; D21H 21/52; D21H 27/10
USPC .................................................... 428/411.1
See application file for complete search history.

(56) References Cited

U.S. PATENT DOCUMENTS

| 5,925,428 | A | 7/1999 | Hubbard et al. | |
|---|---|---|---|---|
| 2012/0208034 | A1 | 8/2012 | Feeney et al. | |
| 2019/0308786 | A1* | 10/2019 | Okamoto | ............... B32B 27/00 |

FOREIGN PATENT DOCUMENTS

| CN | 1628965 | A | | 6/2005 |
|---|---|---|---|---|
| JP | 07-133600 | A | | 5/1995 |
| JP | 2001-254293 | A | | 9/2001 |
| JP | 2002-013095 | A | | 1/2002 |
| JP | 2004-019036 | A | | 1/2004 |
| JP | 2004-218130 | A | | 8/2004 |
| JP | 2004218130 | | * | 8/2004 |
| JP | 2005-186945 | A | | 7/2005 |
| JP | 2007-216592 | A | | 8/2007 |
| JP | 2009-143615 | A | | 7/2009 |
| JP | 2012-206472 | A | | 10/2012 |
| JP | 5331265 | B1 | | 10/2013 |
| JP | 2014-173201 | A | | 9/2014 |
| JP | 2014-173202 | A | | 9/2014 |
| JP | 2014181409 | | * | 9/2014 |
| JP | 2016-064871 | A | | 4/2016 |
| JP | 2016-222878 | A | | 12/2016 |
| JP | 2017-124851 | A | | 7/2017 |
| JP | 6234654 | B1 | | 11/2017 |
| JP | 2018-089979 | A | | 6/2018 |
| JP | 2018-089980 | A | | 6/2018 |
| WO | 2009112255 | A1 | | 9/2009 |
| WO | 2014181560 | A1 | | 11/2014 |

OTHER PUBLICATIONS

Translation of JP 2014-181409 (patents application 2013-054514), Sep. 29, 2014. (Year: 2014).*
Translation of JP 2004-218130 (patents application 2003-005458), Aug. 5, 2004. (Year: 2004).*
International Search Report for PCT/JP2019/040106 dated Nov. 12, 2019 [PCT/ISA/210].
Notice of Reasons for Refusal for Japanese Patent Application No. 2019-037164 dated May 21, 2019.
Decision to Grant a Patent for Japanese Patent Application No. 2019-037164 dated Nov. 22, 2019.
Communication dated Aug. 9, 2021, from the European Patent Office in application No. 19875329.5.

* cited by examiner

*Primary Examiner* — Hui H Chin
(74) *Attorney, Agent, or Firm* — Sughrue Mion, PLLC

(57) ABSTRACT

Gas barrier laminate that is simple to produce and has excellent water vapor barrier properties and gas barrier properties. Also a gas barrier laminate further excellent in recyclability and heat sealing properties, and a method for producing it. The gas barrier laminate has a water vapor barrier layer and a gas barrier layer in that order on at least one surface of a paper support, wherein the water vapor barrier layer contains a layered inorganic compound, a cationic resin and an anionic binder, the aspect ratio of the layered inorganic compound is 50 or more, the thickness of the layered inorganic compound is 200 nm or less, the content of the layered inorganic compound is 0.1 to 800 parts by mass relative to 100 parts by mass of the anionic binder, and the gas barrier layer contains a water-soluble polymer. Method for producing the gas barrier material by coating.

10 Claims, No Drawings

GAS BARRIER LAMINATE AND METHOD FOR PRODUCING SAME

CROSS REFERENCE TO RELATED APPLICATIONS

This application is a National Stage of International Application No. PCT/JP2019/040106 filed Oct. 10, 2019, claiming priority based on Japanese Patent Application Nos. 2018-202291 filed Oct. 26, 2018, 2018-202300 filed Oct. 26, 2018 and 2019-037164 filed Mar. 1, 2019.

TECHNICAL FIELD

The present invention relates to a gas barrier laminate having paper as a support, and to a method for producing it.

BACKGROUND ART

A packaging material having paper as a substrate and given water vapor barrier properties and gas barrier properties (especially oxygen barrier properties) has heretofore been used in packaging, for example, foods, medical supplies and electronic parts for protecting the contents from quality loss.

As a method for giving water vapor barrier properties and gas barrier properties to a paper substrate, a method of laminating a synthetic resin film or a metal foil excellent in gas barrier properties on paper as a support is generally known. However, in a material formed by laminating a synthetic resin film or the like on a paper substrate, paper, the synthetic resin or the like are difficult to recycle after use, and such a material is inconvenient in point of an environmental aspect.

Accordingly, a gas barrier material having paper as a substrate and not using a synthetic resin film or the like is being developed. For example, PTL 1 discloses a paper-made barrier material that has a water vapor barrier layer and a gas barrier layer arranged in that order on a paper substrate. The water vapor barrier layer contains a water vapor barrier resin and a water repellent, and the gas barrier layer contains a water-soluble polymer and a surfactant.

PTL 2 discloses a paper-made barrier packaging material that has a water vapor barrier layer and a gas barrier layer arranged on a paper substrate. The water vapor barrier layer contains kaolin having an average particle size of 5 μm or more and an aspect ratio of 10 or more, in an amount of 50 to 100% by weight relative to the entire pigment therein, and the binder resin in the gas barrier layer is a polyvinyl alcohol resin.

Also, a paper-made barrier packaging material given water vapor barrier properties and gas barrier properties not using a synthetic resin film or the like, and further a paper-made container shaped with a sealant layer provided therein have been developed.

For example PTL 3 discloses a paper-made barrier packaging material that has a water vapor barrier layer containing a pigment and a binder and a gas barrier layer containing a water-soluble polymer, arranged in that order on a paper substrate. The water vapor barrier layer contains, as the binder, a styrene-butadiene resin and a styrene-acrylic resin. PTL 3 further discloses that, as the pigment, a pigment (especially kaolin) having an average particle size of 5 μm or more and an aspect ratio of 50 or more is preferred and a sealant layer (heat seal layer) is provided in the paper-made barrier packaging material.

PTL 4 discloses a paper-made container that uses a paper-made barrier packaging material having a water vapor barrier layer, a gas barrier layer and a sealant layer arranged in that order on a paper substrate, as any member of a body member, a bottom plate member and a lid member. The water vapor barrier layer contains a styrene-butadiene synthetic resin, and an inorganic pigment having an average particle size of 5 μm or more and an aspect ratio of 10 or more, and the gas barrier layer contains a polyvinyl alcohol.

CITATION LIST

Patent Literature

PTL 1: JP 6234654
PTL 2: JP 5331265
PTL 3: JP 2014-173202 A
PTL 4: JP 2017-124851 A

SUMMARY OF INVENTION

Technical Problem

However, in the paper-made barrier material described in PTL 1, the water vapor barrier layer contains a water repellent, and therefore the material is problematic in that a uniform coating layer would be difficult to form in forming a gas barrier layer on the water vapor barrier layer. On the other hand, the paper-made barrier material described in PTL 2 has room for improvement of water vapor barrier properties owing to the existence form of kaolin in the water vapor barrier layer.

Although the paper-made barrier material described in PTL 3 uses a pigment for improving the water vapor barrier properties and the gas barrier properties and a preferred aspect ratio of the pigment is disclosed therein, the material does not have a point of view of optimizing the existence form of the pigment in the water vapor barrier layer therein. Consequently, the paper-made barrier material of PTL 3 still has room for improvement of the processability of the coating liquid for forming the water vapor barrier layer in production and of the water vapor barrier properties of the formed water vapor barrier layer.

In the paper container described in PTL 4, the paper substrate is given water vapor barrier properties and gas barrier properties not laminated with a synthetic resin film, and the outermost sealant layer is formed by film-like lamination with a thermoplastic resin according to an extrusion lamination method or the like. Consequently, the paper container of PTL 4 is poor in disintegrability and therefore has room for improvement in recyclability. Further, in this, the sealant layer is formed according to a method different from that in forming the water vapor barrier layer and the gas barrier layer therein, and therefore the paper container has another inconvenient that the production process is complicated.

The present invention has been made in consideration of the above-mentioned situation. Specifically, an object of the present invention is to provide a gas barrier laminate that is simple to produce and has excellent water vapor barrier properties and gas barrier properties. Further, the present invention is also to provide a gas barrier laminate excellent in recyclability and heat sealing properties, and a method for producing it.

Solution to Problem

The present inventors have made investigations about the kind and the form of a layered inorganic compound in a water vapor barrier layer, and have found that using a layered inorganic compound having an aspect ratio of 50 or more is effective for expressing water vapor barrier properties. Further, the inventors have found that, by adding a cationic resin to a water vapor barrier layer, the coatability and the internal structure of the water vapor barrier layer can be improved. Further, the inventors have found that, by dispersing a thermoplastic water-dispersible resin in a sealant layer, a barrier laminate having high disintegrability and excellent in recyclability can be obtained.

Based on these findings, the present invention has been completed. Specifically, the present invention has the following constitution.

(1) A gas barrier laminate having a water vapor barrier layer and a gas barrier layer in that order on at least one surface of a paper support, wherein the water vapor barrier layer contains a layered inorganic compound, a cationic resin and an anionic binder, the aspect ratio of the layered inorganic compound is 50 or more, the thickness of the layered inorganic compound is 200 nm or less, the content of the layered inorganic compound is 0.1 to 800 parts by mass relative to 100 parts by mass of the anionic binder, and the gas barrier layer contains a water-soluble polymer.

(2) The gas barrier laminate according to the above (1), wherein the anionic binder is at least one selected from the group consisting of a styrene-butadiene copolymer, a styrene-acrylic copolymer, and an olefin-unsaturated carboxylic acid copolymer.

(3) The gas barrier laminate according to the above (1) or the above (2), wherein the surface charge of the cationic resin is 0.1 to 10 meq/g.

(4) The gas barrier laminate according to any one of the above (1) to (3), wherein the water-soluble polymer is a polyvinyl alcohol or a modified polyvinyl alcohol.

(5) The gas barrier laminate according to any one of the above (1) to (4), wherein the gas barrier layer contains the layered inorganic compound.

(6) The gas barrier laminate according to any one of the above (1) to (5), wherein the layered inorganic compound is at least one selected from the group consisting of mica, bentonite and kaolin.

(7) The gas barrier laminate according to any one of the above (1) to (6), further having a sealant layer as at least one outermost layer.

(8) The gas barrier laminate according to the above (7), wherein the sealant layer contains a water-dispersible resin.

(9) The gas barrier laminate according to any one of the above (1) to (8), which is a packaging material.

(10) A method for producing the gas barrier laminate of any one of the above (1) to (9), including forming a water vapor barrier layer on at least one surface of a paper support by coating, and then forming a gas barrier layer on the water vapor barrier layer by coating.

Advantageous Effects of Invention

The gas barrier laminate of the present invention is simple to produce, and has excellent water vapor barrier properties and gas barrier properties, and also excellent recyclability and heat sealing properties.

DESCRIPTION OF EMBODIMENTS

Hereinunder embodiments of the present invention are described specifically. The constitutional elements may be described below with reference to representative embodiments and specific examples of the invention, but the present invention is not limited to the embodiments and the examples. In the description herein, a numerical range expressed as "to" means a range that includes the numerical values described before and after "to" as a lower limit and an upper limit.

The gas barrier laminate of this embodiment has a water vapor barrier layer an a gas barrier layer in that order on at least one surface of a paper support. Further, this may have a sealant layer as at least one outermost layer. A water vapor barrier layer and a gas barrier layer may be arranged on one surface alone of a paper support, or a water vapor barrier layer and a gas barrier layer may be arranged on both surfaces of a paper support.

Hereinunder each layer that constitutes the gas barrier laminate of this embodiment is described.

[Paper Support]

With no specific limitation, the paper support for use in this embodiment may be any kind of generally-used paper that consists of a vegetable-derived pulp as a main ingredient. Specifically, it includes bleached or unbleached kraft paper, high-quality paper, paper board, liner paper, coated paper, semi-enameled paper, glassine paper, and Graphan paper, for example. Preferred is a type of paper that consists of pulp readily dispersible in water by a mechanical disintegrating action, as a main ingredient.

The disintegration freeness of the paper support, as measured according to JIS P8121:2012, is, from the viewpoint of improving barrier properties, preferably 800 ml or less, more preferably 500 ml or less. Here, the disintegration freeness is the Canadian standard freeness of pulp prepared by disintegrating paper according to JIS P8220-1 after papermaking, and measured according to JIS P8121:2012. For preparing the disintegration freeness, pulp may be disintegrated according to a known method.

The basis weight of the paper support is, not specifically limited thereto, preferably 20 to 400 $g/m^2$, more preferably 30 to 320 $g/m^2$.

The sizing degree of the paper support is not specifically limited, but from the viewpoint of improving barrier properties, the Stoeckigt sizing degree thereof according to JIS P 8122:2004 is preferably 1 second or more. The sizing degree of the paper support can be controlled by the kind and the content of the internal sizing agent of rosin-type, alkylketene dimer-type, alkenylsuccinic anhydride-type, styrene-acrylic-type, high fatty acid-type, petroleum resin-type and the like ones, and also by the kind of pulp and the planarizing treatment, for example. The content of the internal sizing agent is, though not specifically limited thereto, preferably within a range of 0 to 3 parts by mass or so relative to 100 parts by mass of pulp of the paper support.

Any other known internal chemical agents may be appropriately added to the paper support. Examples of the internal chemical agents include a loading material such as titanium dioxide, kaolin, talc, and calcium carbonate, as well as a paper strengthening agent, an yield improver, a pH regulator, a freeness improver, a water resistant additive, a softener, an antistatic agent, a defoaming agent, a slime controlling agent, and dye and pigment.

[Water Vapor Barrier Layer]

The water vapor barrier layer is a layer having a function of preventing water vapor penetration, and contains a layered inorganic compound, a cationic resin and an anionic binder.

(Layered Inorganic Compound)

The layered inorganic compound has a tabular form. A mixed solution of a layered inorganic compound and a binder is prepared and applied to a paper support to form a water vapor barrier layer. In the water vapor barrier layer, the tabular layered inorganic compound is aligned in a state layered almost in parallel to the face (surface) of the paper support. In that state, the area where the layered inorganic compound does not exist in the plane direction is small, and therefore water vapor penetration therethrough is suppressed. On the other hand, in the thickness direction, since the tabular layered inorganic compound is aligned to exist in parallel to the face of the paper support, the water vapor in the layer passes around the layered inorganic compound and water vapor penetration through the layer is thereby suppressed. As a result, the water vapor barrier layer can express excellent water vapor barrier properties.

Preferably, the layered inorganic compound has an average length of 1 μm to 100 μm. When the average length is 1 μm or more, the layered inorganic compound in the coating layer can be readily aligned in parallel to the paper support. When the average length is 100 μm or less, there is little risk of protrusion of a part of the layered inorganic compound from the water vapor barrier layer.

The layered inorganic compound has an aspect ratio of 50 or more. In other words, the aspect ratio of the compound is 50 or more than 50. When the aspect ratio is 50 or more, a predetermined water vapor penetration degree can be attained. The aspect ratio of the layered inorganic compound is preferably 80 or more, more preferably 300 or more, even more preferably 500 or more. When the aspect ratio is larger, water vapor penetration can be suppressed more to improve water vapor barrier properties. In addition, when the aspect ratio is larger, the amount of the layered inorganic compound to be added can be reduced more. The upper limit of the aspect ratio is not specifically limited, and is, from the viewpoint of the viscosity of the coating liquid, preferably around 10000 or less. Here, for the aspect ratio, the layered inorganic compound is measured on an enlarged microscopic picture of the cross section of the water vapor barrier layer, and the length of the compound is divided by the thickness thereof, and the data are averaged to give an average value to be the aspect ratio.

The layered inorganic compound has a thickness of 200 nm or less. In other words, the thickness of the compound is 200 nm or less than 200 nm. Here, for the thickness of the layered inorganic compound, the compound is measured on an enlarged microscopic picture of the cross section of the water vapor barrier layer, and the data are averaged to give an average thickness of the compound. Preferably, the thickness of the layered inorganic compound is 100 nm or less, more preferably 50 nm or less. When the average thickness of the layered inorganic compound is smaller, the number of the layers of the layered inorganic compound in the water vapor barrier layer could be larger to exhibit higher water vapor barrier properties.

Specific examples of the layered inorganic compound include mica of a mica group and a brittle mica group, and bentonite, kaolinite (kaolin mineral), pyrophyllite, talc, smectite, vermiculite, chlorite, septechlorite, serpentine, stilpnomelane, and montmorillonite.

Among these, from the viewpoint of improving barrier properties, at least one selected from the group consisting of mica, bentonite and kaolin is preferred, and mica or bentonite is more preferred. Mica includes synthetic mica, muscovite, sericite, phlogopite, biotite, fluorophlogopite (artificial mica), lepidolite, soda mica, vanadium mica, illite, tin mica, paragonite, and brittle mica, for example. Bentonite includes montmorillonite.

The content of the layered inorganic compound is preferably 90% by mass or less in the total solid content of the water vapor barrier layer. The content of the layered inorganic compound is, from the viewpoint of preventing formation of voids in the film structure, more preferably 70% by mass or less, even more preferably 30% by mass or less, especially preferably 20% by mass or less, most preferably 10% by mass or less. On the other hand, the content of the layered inorganic compound is preferably 1% by mass or more, more preferably 2% by mass or more. In this embodiment, by increasing the aspect ratio of the layered inorganic compound and by reducing the thickness thereof, the content of the layered inorganic compound can be reduced. In addition, by increasing the strength of the water vapor barrier layer, the layered inorganic compound can be prevented from dropping from the water vapor barrier layer. In particular, in the case where a layered inorganic compound having a large aspect ratio and a small thickness each falling within a specific range is used, that is, in the case where a layered inorganic compound having an aspect ratio of 80 or more and a thickness of 100 nm or less each falling within a specific range is used, and when an enlarged microscopic picture of the water vapor barrier layer is taken, a dense film without void can be formed, obviously different from a conventional case. The dense film structure without void of the water vapor barrier layer forms a tough coating film and effectively prevents bending and cracking. In addition, it also prevents penetration of a coating liquid for a gas barrier layer and contributes toward formation of a uniform gas barrier layer.

The content of the layered inorganic compound is 0.1 to 800 parts by mass relative to 100 parts by mass of the anionic binder in the water vapor barrier layer. The content of the layered inorganic compound is, from the viewpoint of preventing formation of voids in the film structure, preferably 1 to 400 parts by mass relative to 100 parts by mass of the anionic binder in the water vapor barrier layer, more preferably 1 to 200 parts by mass, even more preferably 1 to 100 parts by mass, especially preferably 1 to 50 parts by mass, most preferably 1 to 20 parts by mass. When the content of the layered inorganic compound is 0.1 parts by mass or more relative to 100 parts by mass of the anionic binder in the water vapor barrier layer, water vapor barrier properties can be readily expressed. Also when the content of the layered inorganic compound is 800 parts by mass or less relative to 100 parts by mass of the anionic binder in the water vapor barrier layer, a risk that a part of the layered inorganic compound may be exposed out of the layer surface to worsen water vapor barrier properties can be reduced. In addition, a risk that the coatability with a gas barrier layer worsens so that a uniform gas barrier layer could not be formed and gas barrier properties may worsen can be reduced.

(Cationic Resin)

The present inventors have found that, by adding a cationic resin to the water vapor barrier layer containing a layered inorganic compound, water vapor barrier properties can be greatly enhanced.

The reason why water vapor barrier properties can be greatly enhanced by adding a cationic resin is considered to be as follows. It is known that, in a layered inorganic compound, the tabular plane part can be readily charged to be anionic and the edge part can be readily charged to be cationic, therefore forming a so-called card house structure of layered inorganic compounds mutually stereographically aggregated with each other. Owing to the card house structure, the viscosity of a water dispersion of the layered inorganic compound can be extremely high. On the other hand, the card house structure is readily broken by force of stirring or the like, and therefore a water dispersion of the layered inorganic compound exhibits thixotropy.

Here, when an appropriate cationic resin is added, the cationic resin is adsorbed to the anionic plane part of the layered inorganic compound and the card house structure is thereby broken. As a result, it is presumed that the layered inorganic compound can be prevented from being stereographically aggregated, and the tabular layered inorganic compound can be readily layered in parallel to the face of a paper support to improve water vapor barrier properties.

Specific examples of the cationic resin include polyalkylene polyamine, polyamide compound, polyamidoamine-epihalohydrin or formaldehyde condensation product, polyamine-epihalohydrin or formaldehyde condensation product, polyamide polyurea-epihalohydrin or formaldehyde condensation product, polyamine polyurea-epihalohydrin or formaldehyde condensation product, polyamidoamine polyurea-epihalohydrin or formaldehyde condensation product, polyamide polyurea compound, polyamine polyurea compound, polyamidoamine polyurea compound and polyamidoamine compound, polyethyleneimine, polyvinylpyridine, amino-modified acrylamide compound, polyvinylamine, and polydiallyldimethylammonium chloride.

The surface charge of the cationic resin is preferably 0.1 to 10 meq/g, more preferably 0.1 to 5.0 meq/g. When the surface charge of the cationic resin falls within the range, the resin can break a card house structure and can suitably coexist with an anionic binder to be mentioned hereinunder. The surface charge of the cationic resin is measured according to the following method.

A polymer to be a sample is dissolved in water to prepare a solution having a polymer concentration of 1 ppm. Using a charge analyzer Mutek PCD-04 Model (by BTG Corporation), 0.001N sodium polyethylenesulfonate is dropwise added to the resultant solution to measure the charge amount of the sample.

The content of the cationic resin may be appropriately selected depending on the kind of the layered inorganic compound and the anionic binder to be used in the water vapor barrier layer and is, from the viewpoint of improving barrier properties, preferably 1 to 300 parts by mass relative to 100 parts by mass of the layered inorganic compound, more preferably 1 to 250 parts by mass, even more preferably 10 to 150 parts by mass, especially more preferably 20 to 150 parts by mass, and most preferably 20 to 100 parts by mass.

Also the content of the cationic resin is preferably 0.1 to 20 parts by mass relative to 100 parts by mass of the anionic binder in the water vapor barrier layer, more preferably 0.1 to 15 parts by mass, even more preferably 1 to 10 parts by mass.

(Anionic Binder)

The present inventors have further found that when an anionic binder is used, water vapor barrier properties can be improved more. As described above, the plane part of a layered inorganic compound is anionic but when a cationic resin is adsorbed thereto, the surface becomes cationic. Consequently, the affinity of the resultant compound with an anionic binder is increased.

The anionic binder is preferably a binder modified with a monomer that contains a carboxylic acid group. The polymer to form the skeleton of the anionic binder includes a styrene-butadiene copolymer, a styrene-acrylic copolymer, a methacrylate-butadiene copolymer, an acrylonitrile-butadiene copolymer, an olefin-unsaturated carboxylic acid copolymer, an acrylic ester polymer and the like. Among these, at least one selected from the group consisting of a styrene-butadiene copolymer, a styrene-acrylic copolymer and an olefin-unsaturated carboxylic acid copolymer is preferred, as the water resistance of the coating layer is good and the elongation thereof is good, and the layer is hardly cracked by bending.

The styrene-butadiene copolymer is a copolymer to be prepared by emulsion polymerization of monomers of an aromatic vinyl compound such as styrene, a-methylstyrene, vinyltoluene, p-t-butylstyrene or chlorostyrene, a conjugated diene compound such as 1,3-butadiene, isoprene, 2,3-dimethyl-1,3-butadiene or 1,3-pentadiene, and any other compound copolymerizable with these. The aromatic vinyl compound is preferably styrene, and the conjugated diene compound is preferably 1,3-butadiene.

The styrene-acrylic copolymer is a copolymer to be prepared by emulsion polymerization of monomers of an aromatic vinyl compound such as styrene, a-methylstyrene, vinyltoluene, p-t-butylstyrene or chlorostyrene, an unsaturated carboxylic acid such as acrylic acid, methacrylic acid, crotonic acid, cinnamic acid, itaconic acid, fumaric acid, maleic acid or butenetricarboxylic acid, an alkyl ester of an unsaturated polycarboxylic acid having at least one carboxy group such as itaconic acid monoethyl ester, fumaric acid monobutyl ester or maleic acid monobutyl ester, an unsaturated sulfonic acid monomer or a salt thereof such as acrylamidepropanesulfonic acid, sodium sulfoethyl acrylate or sodium sulfopropyl methacrylate, and any other compound copolymerizable with these. The aromatic vinyl compound is preferably styrene, and the unsaturated carboxylic acid monomer and the unsaturated sulfonic acid monomer or salts thereof are preferably acrylic acid, methacrylic acid, itaconic acid, fumaric acid and the like.

The olefin-unsaturated carboxylic acid copolymer is a copolymer to be prepared by emulsion polymerization of monomers of an olefin, especially an α-olefin such as ethylene or propylene, and an unsaturated carboxylic acid such as acrylic acid, methacrylic acid, crotonic acid, cinnamic acid, itaconic acid, fumaric acid, maleic acid or butenetricarboxylic acid, an alkyl ester of an unsaturated polycarboxylic acid having at least one carboxy group such as itaconic acid monoethyl ester, fumaric acid monobutyl ester or maleic acid monobutyl ester, an unsaturated sulfonic acid monomer or a salt thereof such as acrylamidepropanesulfonic acid, sodium sulfoethyl acrylate or sodium sulfopropyl methacrylate, and any other compound copolymerizable with these. The olefin is preferably an α-olefin, especially ethylene, for example, and the unsaturated carboxylic acid monomer, the unsaturated sulfonic acid monomer or salts thereof are preferably acrylic acid, methacrylic acid, itaconic acid and fumaric acid. As specific examples of the olefin-unsaturated carboxylic acid copolymer, for example, an aqueous dispersion of an ethylene-acrylic acid copolymer ammonium salt is commercially sold as Zaikthene (registered trademark) AC (acrylic acid copolymerization ratio 20%, by Sumitomo Seika Chemicals Co., Ltd.), and is easily available and usable.

Specifically, the other copolymerizable compounds include a cyano group-containing ethylenically unsaturated compound, an ethylenically unsaturated acid glycidyl ether, an unsaturated alcohol glycidyl ether, and a (meth)acrylamide compound, for example.

The anionic binder can be prepared by copolymerizing and modifying a polymer to be the above-mentioned skeleton with a carboxylic acid-containing monomer. The copolymerization ratio of the carboxylic acid group-containing monomer is preferably 1 to 50 mol %.

The weight-average molecular weight of the anionic binder is, from the viewpoint of the viscosity of the coating liquid, preferably 10,000 to 10,000,000, more preferably 100,000 to 5,000,000.

Though not specifically limited, the content ratio of the anionic binder is preferably 20% by mass or more in the total solid content in the water vapor barrier layer, more preferably 50% by mass or more, even more preferably 60% by mass or more, especially preferably 70% by mass or more, most preferably 80% by mass or more.

If desired, a dispersant, a surfactant, a defoaming agent, a wetting agent, a dye, a color regulator, a thickener and the like may be optionally added to the water vapor barrier layer, in addition to the layered inorganic compound, the cationic resin and the anionic binder.

The thickness of the water vapor barrier layer is preferably 1 to 30 μm, more preferably 3 to 20 μm. Also preferably, the coating amount of the water vapor barrier layer is 1 to 30 g/m$^2$ as a solid content therein, more preferably 3 to 20 g/m$^2$.

[Gas Barrier Layer]

The gas barrier layer is a layer having a main function of preventing penetration of an oxygen gas, and contains a water-soluble polymer.

(Water-Soluble Polymer)

Examples of the water-soluble polymer include a polyvinyl alcohol, a modified polyvinyl alcohol, starch and a derivative thereof, a cellulose derivative, a polyvinylpyrrolidone, an urethane resin, a polyacrylic acid and a salt thereof, casein, and a polyethyleneimine.

Among these, a completely saponified or partially saponified polyvinyl alcohol, or a modified polyvinyl alcohol is preferred, as excellent in gas barrier properties. The modified polyvinyl alcohol includes an ethylene-modified polyvinyl alcohol, a carboxy-modified polyvinyl alcohol, a silicon-modified polyvinyl alcohol, an acetoacetyl-modified polyvinyl alcohol, and a diacetone-modified polyvinyl alcohol, for example.

The content of the water-soluble polymer is preferably 50 to 100% by mass in the total solid content in the gas barrier layer, more preferably 70 to 100% by mass.

The gas barrier layer may also contain the above-mentioned layered inorganic compound, like the water vapor barrier layer. In the case where a layered inorganic compound is contained in the gas barrier layer, the content of the layered inorganic compound is, though not specifically limited, preferably 1 to 20 parts by mass or so relative to 100 parts by mass of the water-soluble polymer in the gas barrier layer, more preferably 5 to 15 parts by mass. The layered inorganic compound is, from the viewpoint of improving barrier properties, preferably at least one selected from the group consisting of mica, bentonite and kaolin. The layered inorganic compound contained in the gas barrier layer may be the same kind as that of the layered inorganic compound contained in the water vapor barrier layer, or may a different kind from the latter.

If desired, a pigment, a dispersant, a surfactant, a defoaming agent, a wetting agent, a dye, a color regulator, a thickener and the like may be optionally added to the gas barrier layer, in addition to the water-soluble polymer and the layered inorganic compound. From among the layered inorganic compounds usable in the water vapor barrier layer, any desired one can be appropriately selected and contained in the gas barrier layer.

The thickness of the gas barrier layer is preferably 0.1 to 10 μm, more preferably 0.5 to 5 μm. The coating amount of the gas barrier layer is preferably 0.1 to 10 g/m$^2$ as a solid content, more preferably 0.5 to 5 g/m$^2$.

[Sealant Layer]

The sealant layer is a layer capable of mutually bonding gas barrier laminates to each other by hot melting by heat or ultrasonic waves.

The gas barrier laminate has a water vapor barrier layer and a gas barrier layer in that order on at least one surface of a paper support, and may further have a sealant layer as at least one outermost layer. Namely, the sealant layer may be formed on any one or both of the surface of the gas barrier layer on the side of the paper support on which a water vapor barrier layer and a gas barrier layer are formed, or the surface of the paper support on the side on which a water vapor barrier layer and a gas barrier layer are not formed.

The sealant layer is formed by coating with an emulsified dispersion that contains a water-dispersible thermoplastic resin (water-dispersible resin). Thus formed, the sealant layer can heat-seal the water-dispersible resin dispersed in the layer to mutually bond gas barrier laminates to each other, even though it does not have a form of a film of a thermoplastic resin. Such a sealant layer is more highly disintegrable than a layer of a film of a thermoplastic resin and is suitable for recycling by disintegration, and therefore can reduce the environmental load of gas barrier laminates.

As mentioned above, the sealant layer is formed by coating, and therefore the sealant layer can be formed in the same manner as that for forming the water vapor barrier layer and the gas barrier layer, that is, as compared with a case where the sealant layer is formed by lamination or the like, the gas barrier laminate of the type can be produced in a more simplified manner.

The water-dispersible resin for use in the sealant layer is preferably at least one selected from the group consisting of a carboxy group-having polyolefin, a polyolefin elastomer, an ethylene-vinyl acetate copolymer, an ionomer resin, a low-molecular-weight polyolefin wax, and a biodegradable resin. Such a water-dispersible resin can make up minor coating defects of the water vapor barrier layer or the gas barrier layer by forming a layer thereof according to the same coating method. Accordingly, in this embodiment, the content ratio of the layered inorganic compound and the cationic resin can be selected from a further broader range to suppress reduction in barrier properties.

The sealant layer preferably contains a biodegradable resin. Not specifically limited, examples of the biodegradable resin include polylactic acid (PLA), polybutylene succinate (PBS), polybutylene succinate adipate (PBSA), and 3-hydroxybutanoic acid/3-hydroxyhexanoic acid copolymer (PHBH).

The thickness of the sealant layer is preferably 1 to 50 μm, more preferably 3 to 30 μm. The coating amount of the sealant layer is preferably 1 to 50 g/m$^2$ as a solid content, more preferably 3 to 30 g/m$^2$.

[Gas Barrier Laminate]

(Production Method)

The gas barrier laminate can be produced by first applying a coating liquid for forming a water vapor barrier layer to at least one surface of a paper support to form a water vapor barrier layer thereon, and then applying a coating liquid for forming a gas barrier layer thereto to form a gas barrier layer. Each layer can be formed by successive coating with a coating liquid and drying, or may be formed by simultaneous multilayer coating followed by drying.

The gas barrier laminate can also be produced by forming a water vapor barrier layer on at least one surface of a paper support by coating, then forming a gas barrier layer on the water vapor barrier layer by coating, and then forming a sealant layer as at least one outermost layer by coating. Each layer can be formed by successive coating with a coating liquid and drying, or may be formed by simultaneous multilayer coating followed by drying. In that manner, in the method for producing a gas barrier laminate of this embodiment, the water vapor barrier layer, the gas barrier layer and the sealant layer are formed all by coating, and therefore the production method is simple.

Not specifically limited, the solvent for the coating liquid may be any of water or an organic solvent such as ethanol, isopropyl alcohol, methyl ethyl ketone or toluene.

Not specifically limited, the coating device for coating a paper support with a coating liquid may be any known device. Examples of the coating device include a blade coater, a bar coater, an air knife coater, a slit die coater, a gravure coater, a microgravure coater, and a gate roll coater. Especially in forming a water vapor barrier layer, a coater capable of scraping the surface to be coated, such as a blade coater, a bar coater, an air knife coater or a slit die coater is preferred as promoting orientation of the layered inorganic compound in the formed layer.

Also not specifically limited, the drying device for drying the coating layer may be any known device. Examples of the coating device include a hot air drier, an IR drier, a gas burner and a hot plate.

The gas barrier laminate of this embodiment contains a layered inorganic compound, a cationic resin and an anionic binder in the water vapor barrier layer therein, and therefore the viscosity of the coating liquid for the water vapor barrier layer does not increase excessively, and the workability (coatability) in production is excellent. Owing to such excellent coatability, the layered inorganic compound in the water vapor barrier layer is appropriately oriented and layered, therefore providing excellent water vapor barrier properties. Since the surface of the water vapor barrier layer is formed flatly, the gas barrier layer thereon can be formed uniformly, therefore providing excellent gas barrier properties. In the case where a sealant layer is formed on the gas barrier layer by coating, the sealant layer can also be formed uniformly owing to the uniformness of the gas barrier layer, therefore providing excellent heat sealing properties. Further, the sealant layer formed of an emulsified dispersion that contains a water-dispersible resin realizes the heat sealing function, and therefore the gas barrier laminate is simple to produce and is excellent in recyclability.

Taking advantage of the above-mentioned excellent water vapor barrier properties and gas barrier properties, the gas barrier laminate of this embodiment can be favorably used as packaging materials for foods, medical supplies and electronic parts. In addition, the gas barrier laminate of this embodiment is resistant to bending and cracking, and can also be favorably used as soft packaging materials.

EXAMPLES

Hereinunder the gas barrier laminate of the present invention is described more specifically with reference to Examples, but the present invention is not limited to these. In Examples and Comparative Examples, "part" and "%" are "part by mass" and "% by mass" respectively, unless otherwise specifically indicated.

Raw materials used in Examples and Comparative Examples are as follows.

(1) Paper Support
Bleached kraft paper: basis weight 70 g/m$^2$, thickness 100 µm.
(2) Layered Inorganic Compound
Mica: swelling mica, particle size 6.3 µm, aspect ratio about 1000, thickness about 5 nm, solid content 6%, product name: NTO-05, by Topy Industries, Limited.
Bentonite: swelling bentonite, particle size 300 nm, aspect ratio 300, thickness about 1 nm, solid content 100%, product name: Kunipia F, by Kunimine Industries, Co., Ltd.
Kaolin: Engineered kaolin, particle size 9.0 µm, aspect ratio 80 to 100, thickness about 0.1 µm, solid content 100%, product name: BARRISURF HX, by IMERYS Minerals Japan K.K.
Phlogopite: particle size 20 µm, aspect ratio 20 to 30, thickness about 1 µm, solid content 100%, product name: AB32, by Yamaguchi Mica Co., Ltd.
(3) Cationic Resin
Modified polyamide resin: solid content 53%, product name: SPI203(50), by Taoka Chemical Co., Ltd., surface charge 0.4 meq/g.
(4) Anionic Binder
Acid-modified SBR latex: solid content 47.3%, product name: LX407S12, by Zeon Corporation.
Acid-modified SBR latex: solid content 50.5%, product name: LX407BP-6, by Zeon Corporation.
Styrene-acrylic resin emulsion: solid content 53.8%, product name: Herbil C-3, by Dai-ichi Toryo Mfg., Ltd.
Olefin/unsaturated carboxylic acid emulsion: solid content 29.0%, product name: Zaikthene AC, by Sumitomo Seika Chemicals Co., Ltd.
(5) Water-Soluble Polymer
Polyvinyl alcohol: completely saponified polyvinyl alcohol, product name: Poval PVA117, by Kuraray Co., Ltd.
(6) Water-Dispersible Resin
Carboxy-modified polyolefin (PO) polymer emulsion: counter ion: ammonium ion, solid content 28.5%, product name: Zaikthene AC, by Sumitomo Seika Chemicals Co., Ltd.
Carboxy-modified polyolefin (PO) polymer emulsion: counter ion: alkylammonium ion, solid content 23.0%, product name: Zaikthene L, by Sumitomo Seika Chemicals Co., Ltd.
Carboxy-modified polyolefin (PO) polymer emulsion: counter ion: sodium ion, solid content 23.0%, product name: Zaikthene N, by Sumitomo Seika Chemicals Co., Ltd.
Polyolefin (PE) elastomer emulsion: solid content 40.0%, product name: Chemipearl A400, by Mitsui Chemicals, Inc.
Polyolefin (PE) elastomer emulsion: solid content 40.0%, product name: Chemipearl A100, by Mitsui Chemicals, Inc.
Polyolefin (LDPE) elastomer emulsion: solid content 40.0%, product name: Chemipearl M200, by Mitsui Chemicals, Inc.
Ethylene/vinyl acetate (EVA) emulsion: solid content 40.0%, product name: Chemipearl V200, by Mitsui Chemicals, Inc.
Ionomer (IO) emulsion: solid content 27.0%, product name: Chemipearl S200, by Mitsui Chemicals, Inc.
Low-molecular weight polyolefin (PE) wax emulsion: solid content 40.0%, product name: Chemipearl W400, by Mitsui Chemicals, Inc.
Polylactic acid resin (PLA) emulsion: solid content 40.0%, product name: LANDY PL-3000, by Miyoshi Oil & Fat Co., Ltd.
(7) Sealant Film
Low-density polyethylene: LDPE, product name: Suntec L4490, by Asahi Kasei Corporation Polylactic acid film: PLA, product name: Ecoloju, by Mitsubishi Chemical Corporation Polybutylene succinate: PBS, product name: Bio PBS FZ71, by Mitsubishi Chemical Corporation LLDPE film: T.U.X FCS, 30 μm thick, by Mitsui Chemicals Tohcello, Inc.

Example 1

With stirring, 90.0 parts of an anionic binder, acid-modified SBR latex (LX407S12) and 9.4 parts of an acid-modified SBR latex (LX407BP-6) were added to 47.3 parts of an aqueous dispersion of a layered inorganic compound (swelling mica, NTO-05) and stirred. 4.5 parts of a cationic resin, modified polyamide resin (SPI203 (50)) was added thereto, and stirred. Further, 0.6 parts of an aqueous 25% ammonia was added and stirred. Further, dilution water was added to give a coating liquid for a water vapor barrier layer having a solid concentration of 32%.

An aqueous solution of a water-soluble polymer, polyvinyl alcohol (PVA, Poval PVA117) having a solid concentration of 10% was prepared to be a coating liquid for a gas barrier layer.

The resultant coating liquid for a water vapor barrier layer was applied to one surface of bleached kraft paper so that the coating amount of the liquid for a water vapor barrier layer after dried could be 13 g/m$^2$, using a Mayer bar, and then dried in a hot air drying machine at 120° C. for 1 minute to form a water vapor barrier layer. Further, on the water vapor barrier layer, a coating liquid for a gas barrier layer was applied so that the coating amount of the liquid for a gas barrier layer after dried could be 2.0 g/m$^2$, using a Mayer bar, and then dried in a hot air drying machine at 120° C. for 1 minute to form a gas barrier layer, thereby giving a gas barrier laminate. The coating amount was controlled by the solid concentration in the coating liquid and by the count of the Mayer bar.

Example 2

A gas barrier laminate was produced in the same manner as in Example 1, except that the amount of the modified polyamide resin to be added was changed to 0.1 parts.

Example 3

A gas barrier laminate was produced in the same manner as in Example 1, except that the amount of the modified polyamide resin to be added was changed to 3.8 parts.

Example 4

A gas barrier laminate was produced in the same manner as in Example 1, except that the amount of the modified polyamide resin to be added was changed to 11.3 parts.

Example 5

A gas barrier laminate was produced in the same manner as in Example 1, except that the amount of the modified polyamide resin to be added was changed to 15.1 parts.

Example 6

A gas barrier laminate was produced in the same manner as in Example 1, except that 47.3 parts of the aqueous dispersion of a layered inorganic compound (swelling mica, NTO-05) was changed to 12 parts of bentonite (swelling bentonite, Kunipia F).

Example 7

A gas barrier laminate was produced in the same manner as in Example 1, except that 47.3 parts of the aqueous dispersion of a layered inorganic compound (swelling mica, NTO-05) was changed to 20 parts of kaolin (BARRISURF HX).

Example 8

A gas barrier laminate was produced in the same manner as in Example 1, except that 90.0 parts of the acid-modified SBR latex (LX407S12) and 9.4 parts of the acid-modified SBR latex (LX407BP-6) of the coating liquid for the water vapor barrier layer were changed to 87.9 parts of a styrene-acrylic resin emulsion (Herbil C-3).

Example 9

A gas barrier laminate was produced in the same manner as in Example 8, except that the amount of the modified polyamide resin to be added was changed to 0.1 parts.

Example 10

A gas barrier laminate was produced in the same manner as in Example 8, except that the amount of the modified polyamide resin to be added was changed to 3.8 parts.

Example 11

A gas barrier laminate was produced in the same manner as in Example 8, except that the amount of the modified polyamide resin to be added was changed to 11.3 parts.

Example 12

A gas barrier laminate was produced in the same manner as in Example 8, except that the amount of the modified polyamide resin to be added was changed to 15.1 parts.

Example 13

A gas barrier laminate was produced in the same manner as in Example 8, except that 47.3 parts of the aqueous dispersion of a layered inorganic compound (swelling mica, NTO-05) was changed to 12 parts of bentonite (swelling bentonite, Kunipia F).

Example 14

A gas barrier laminate was produced in the same manner as in Example 8, except that 47.3 parts of the aqueous dispersion of a layered inorganic compound (swelling mica, NTO-05) was changed to 20 parts of kaolin (BARRISURF HX).

Example 15

A gas barrier laminate was produced in the same manner as in Example 1, except that 90.0 parts of the acid-modified SBR latex (LX407S12) and 9.4 parts of the acid-modified SBR latex (LX407BP-6) of the coating liquid for the water vapor barrier layer were changed to 162.0 parts of an olefin/unsaturated carboxylic acid resin emulsion (Zaikthene AC).

Example 16

A gas barrier laminate was produced in the same manner as in Example 8, except that a step of laminating a sealant layer in a thickness of 30 μm was added by extrusion lamination of low-density polyethylene (LDPE) on both surfaces of the gas barrier laminate having, as formed thereon, a water vapor barrier layer and an oxygen barrier layer.

Example 17

A gas barrier laminate was produced in the same manner as in Example 16, except that the lamination method was changed to dry lamination with a polylactic acid (PLA) film and that the film was laminated only on the gas barrier layer side.

Example 18

A gas barrier laminate was produced in the same manner as in Example 16, except that the resin for lamination was changed from low-density polyethylene to polybutylene succinate (PBS).

Example 19

A gas barrier laminate was produced in the same manner as in Example 17, except that 87.9 parts of the styrene-acrylic resin emulsion (Herbil C-3) in the coating liquid for a water vapor barrier layer was changed to 162.0 parts of an olefin/unsaturated carboxylic acid resin emulsion (Zaikthene AC).

Example 20

A gas barrier laminate was produced in the same manner as in Example 1, except that 335 parts of an aqueous solution of a water-soluble polymer, polyvinyl alcohol (PVA, Poval PVA117) having a solid concentration of 12% and not 10%, 66.7 parts of an aqueous dispersion of a layered inorganic compound (swelling mica, NTO-05) and 40 parts of water were mixed to prepare a coating liquid for a gas barrier layer.

Example 21

A gas barrier laminate was produced in the same manner as in Example 8, except that 335 parts of an aqueous solution of a water-soluble polymer, polyvinyl alcohol (PVA, Poval PVA117) having a solid concentration of 12% and not 10%, 66.7 parts of an aqueous dispersion of a layered inorganic compound (swelling mica, NTO-05) and 40 parts of water were mixed to prepare a coating liquid for a gas barrier layer.

Example 22

A gas barrier laminate was produced in the same manner as in Example 15, except that 335 parts of an aqueous solution of a water-soluble polymer, polyvinyl alcohol (PVA, Poval PVA117) having a solid concentration of 12% and not 10%, 66.7 parts of an aqueous dispersion of a layered inorganic compound (swelling mica, NTO-05) and 40 parts of water were mixed to prepare a coating liquid for a gas barrier layer.

Example 23

A gas barrier laminate was produced in the same manner as in Example 17, except that 335 parts of an aqueous solution of a water-soluble polymer, polyvinyl alcohol (PVA, Poval PVA117) having a solid concentration of 12% and not 10%, 66.7 parts of an aqueous dispersion of a layered inorganic compound (swelling mica, NTO-05) and 40 parts of water were mixed to prepare a coating liquid for a gas barrier layer.

Example 24

A gas barrier laminate was produced in the same manner as in Example 1, except that 335 parts of an aqueous solution of a water-soluble polymer, polyvinyl alcohol (PVA, Poval PVA117) having a solid concentration of 12% and not 10%, 35.0 parts of an aqueous dispersion of a layered inorganic compound (swelling mica, NTO-05) and 40 parts of water were mixed to prepare a coating liquid for a gas barrier layer.

Example 25

A gas barrier laminate was produced in the same manner as in Example 1, except that 335 parts of an aqueous solution of a water-soluble polymer, polyvinyl alcohol (PVA, Poval PVA117) having a solid concentration of 12% and not 10%, 90.0 parts of an aqueous dispersion of a layered inorganic compound (swelling mica, NTO-05) and 40 parts of water were mixed to prepare a coating liquid for a gas barrier layer.

Example 26

A gas barrier laminate was produced in the same manner as in Example 15, except that 47.3 parts of the aqueous dispersion of a layered inorganic compound (swelling mica, NTO-05) was changed to 94.0 parts of kaolin (BARRISURF HX).

Example 27

A gas barrier laminate was produced in the same manner as in Example 15, except that 47.3 parts of the aqueous dispersion of a layered inorganic compound (swelling mica, NTO-05) was changed to 188.0 parts of kaolin (BARRISURF HX).

Example 28

A gas barrier laminate was produced in the same manner as in Example 26, except that a step of laminating a sealant layer in a thickness of 30 μm was added by extrusion lamination of polybutylene succinate (PBS) on both surfaces of the gas barrier laminate having, as formed thereon, a water vapor barrier layer and an oxygen barrier layer.

Comparative Example 1

A gas barrier laminate was produced in the same manner as in Example 1, except that the coating liquid for a water vapor barrier layer did not contain a modified polyamide resin.

Comparative Example 2

A gas barrier laminate was produced in the same manner as in Example 1, except that 47.3 parts of the aqueous dispersion of a layered inorganic compound (swelling mica, NTO-05) was changed to 20 parts of kaolin (BARRISURF HX) and that the coating liquid for a water vapor barrier layer did not contain a modified polyamide resin.

Comparative Example 3

A gas barrier laminate was produced in the same manner as in Example 8, except that the coating liquid for a water vapor barrier layer did not contain a modified polyamide resin.

Comparative Example 4

A gas barrier laminate was produced in the same manner as in Example 8, except that 47.3 parts of the aqueous dispersion of a layered inorganic compound (swelling mica, NTO-05) was changed to 20 parts of kaolin (BARRISURF HX) and that the coating liquid for a water vapor barrier layer did not contain a modified polyamide resin.

Comparative Example 5

A gas barrier laminate was produced in the same manner as in Example 8, except that 47.3 parts of the aqueous dispersion of a layered inorganic compound (swelling mica, NTO-05) was changed to 20 parts of phlogopite (AB32).

Comparative Example 6

A gas barrier laminate was produced in the same manner as in Example 8, except that 47.3 parts of the aqueous dispersion of a layered inorganic compound (swelling mica, NTO-05) was changed to 20 parts of phlogopite (AB32) and that the coating liquid for a water vapor barrier layer did not contain a modified polyamide resin.

The resultant gas barrier laminates (in Examples 16 to 19 and 28, the sealant layer-having gas barrier laminates) were evaluated in point of water vapor barrier properties (water vapor permeability), gas barrier properties (oxygen permeability) and denseness. Evaluation methods for each item are as shown below.

<Water Vapor Permeability>

According to JIS-Z-0208 (cup method), B method (40° C.±0.5° C., 90%±2% RH), the laminate was tested while the water vapor barrier layer thereof was kept inside. Regarding the standard for the water vapor permeability, when the found value is 50 g/m$^2$·24 h or less, the water vapor barrier layer is practicable.

<Oxygen Permeability>

Using an oxygen permeability measuring apparatus (by MOCON Corporation, OX-TRAN2/20), the laminate was analyzed under the condition of 23° C. and 50% RH. Regarding the standard for the oxygen permeability, when the found value is 10 cc/m$^2$·24 h or less, the gas barrier layer is practicable.

<Denseness>

A cross section of the gas barrier laminate was visually observed on an enlarged microscopic picture (electron microscopic picture) thereof, and evaluated according to the following criteria. A and B were judged to be good. In particular, voids in the cross section picture were discerned as contrast inconsistency to achieve strict film structure evaluation.

A: The water vapor barrier layer is uniform and is highly dense, and has high barrier properties.

B: In the water vapor barrier layer, the layered inorganic compound is distinct, but the layer is highly dense and has high barrier properties.

C: The water vapor barrier layer is dense, but has poor barrier properties.

D: The water vapor barrier layer is extremely poorly dense, and has poor barrier properties.

The evaluation results of the gas barrier laminates of Examples 1 to 28 and Comparative Examples 1 to 6 are shown in Table 1 and Table 2.

TABLE 1

| | Water Vapor Barrier Layer | | | | | | |
|---|---|---|---|---|---|---|---|
| | Kind of Anionic Binder | Content of Cationic Resin (anionic binder 100 parts) part by mass | Kind of Layered Inorganic Compound | Aspect Ratio of Layered Inorganic Compound | Thickness of Layered Inorganic Compound nm | Content of Layered Inorganic Compound (anionic binder 100 parts) part by mass | Gas Barrier Layer Kind of Water-Soluble Polymer |
| Example 1 | SBR | 5.0 | mica | 1000 | 5 | 6.0 | PVA |
| Example 2 | SBR | 0.1 | mica | 1000 | 5 | 6.0 | PVA |
| Example 3 | SBR | 4.3 | mica | 1000 | 5 | 6.0 | PVA |
| Example 4 | SBR | 12.7 | mica | 1000 | 5 | 6.0 | PVA |
| Example 5 | SBR | 16.9 | mica | 1000 | 5 | 6.0 | PVA |
| Example 6 | SBR | 5.0 | bentonite | 300 | 1 | 25.4 | PVA |
| Example 7 | SBR | 5.0 | kaolin | 80-100 | 100 | 42.3 | PVA |
| Example 8 | styrene-acrylic-based | 5.0 | mica | 1000 | 5 | 6.0 | PVA |
| Example 9 | styrene-acrylic-based | 0.1 | mica | 1000 | 5 | 6.0 | PVA |
| Example 10 | styrene-acrylic-based | 4.3 | mica | 1000 | 5 | 6.0 | PVA |
| Example 11 | styrene-acrylic-based | 12.7 | mica | 1000 | 5 | 6.0 | PVA |
| Example 12 | styrene-acrylic-based | 16.9 | mica | 1000 | 5 | 6.0 | PVA |
| Example 13 | styrene-acrylic-based | 5.0 | bentonite | 300 | 1 | 25.4 | PVA |
| Example 14 | styrene-acrylic-based | 5.0 | kaolin | 80-100 | 100 | 42.3 | PVA |

TABLE 1-continued

| | | | | | | | |
|---|---|---|---|---|---|---|---|
| Example 15 | olefin/ unsaturated carboxylic acid-based | 5.1 | mica | 1000 | 5 | 6.0 | PVA |
| Example 16 | styrene-acid-based | 5.0 | mica | 1000 | 5 | 6.0 | PVA |
| Example 17 | styrene-acrylic-based | 5.0 | mica | 1000 | 5 | 6.0 | PVA |
| Example 18 | styrene-acrylic-basect | 5.0 | mica | 1000 | 5 | 6.0 | PVA |
| Example 19 | olefin/ unsaturated carboxylic acid-based | 5.1 | mica | 1000 | 5 | 6.0 | PVA |

| | Gas Barrier Layer | | | Performance | | |
|---|---|---|---|---|---|---|
| | Kind of Layered Inorganic Compound | Content of Layered Inorganic Compound (water-soluble resin 100 parts) | Sealant Layer Kind of Resin | Water Vapor Permeability g/m² · 24 h | Oxygen Permeability cc/m² · 24 h | Denseness |
| Example 1 | — | — | — | 13 | 0.5 | A |
| Example 2 | — | — | — | 34 | 1.5 | A |
| Example 3 | — | — | — | 23 | 1.2 | A |
| Example 4 | — | — | — | 36 | 1.5 | A |
| Example 5 | — | — | — | 50 | 1.8 | A |
| Example 6 | — | — | — | 43 | 1.7 | A |
| Example 7 | — | — | — | 49 | 2.1 | B |
| Example 8 | — | — | — | 15 | 0.5 | A |
| Example 9 | — | — | — | 31 | 1.5 | A |
| Example 10 | — | — | — | 20 | 1.0 | A |
| Example 11 | — | — | — | 38 | 1.6 | A |
| Example 12 | — | — | — | 42 | 1.9 | A |
| Example 13 | — | — | — | 40 | 1.3 | A |
| Example 14 | — | — | — | 48 | 2.4 | B |
| Example 15 | — | — | — | 12 | 1.0 | A |
| Example 16 | — | — | LDPE | 9 | 0.5 | A |
| Example 17 | — | — | PLA | 11 | 0.6 | A |
| Example 18 | — | — | PBS | 11 | 0.5 | A |
| Example 19 | — | — | PLA | 12 | 1.0 | A |

TABLE 2

| | Water Vapor Barrier Layer | | | | | | Gas Barrier Layer Kind of Water-Soluble Polymer |
|---|---|---|---|---|---|---|---|
| | Kind of Anionic Binder | Content of Cationic Resin (anionic binder 100 parts) part by mass | Kind of Layered Inorganic Compound | Aspect Ratio of Layered Inorganic Compound | Thickness of Layered Inorganic Compound nm | Content of Layered Inorganic Compound (anionic binder 100 parts) part by mass | |
| Example 20 | SBR | 5.0 | mica | 1000 | 5 | 6.0 | PVA |
| Example 21 | styrene-acrylic-based | 5.0 | mica | 1000 | 5 | 6.0 | PVA |
| Example 22 | olefin-unsaturated carboxylic acid-based | 5.1 | mica | 1000 | 5 | 6.0 | PVA |
| Example 23 | styrene-acrylic-based | 5.0 | mica | 1000 | 5 | 6.0 | PVA |
| Example 24 | SBR | 5.0 | mica | 1000 | 5 | 6.0 | PVA |
| Example 25 | SBR | 5.0 | mica | 1000 | 5 | 6.0 | PVA |
| Example 26 | olefin-unsaturated carboxylic acid-based | 5.1 | kaolin | 80-100 | 100 | 200 | PVA |
| Example 27 | olefin-unsaturated carboxylic acid-based | 5.1 | kaolin | 80-100 | 100 | 400 | PVA |

TABLE 2-continued

| | | | | | | | |
|---|---|---|---|---|---|---|---|
| Example 28 | olefin-unsaturated carboxylic acid-based | 5.1 | kaolin | 80-100 | 100 | 200 | PVA |
| Comparative Example 1 | SBR | 0.0 | mica | 1000 | 5 | 6.0 | PVA |
| Comparative Example 2 | SBR | 0.0 | kaolin | 80-100 | 100 | 42.3 | PVA |
| Comparative Example 3 | styrene-acrylic-based | 0.0 | mica | 1000 | 5 | 6.0 | PVA |
| Comparative Example 4 | styrene-acrylic-based | 0.0 | kaolin | 80-100 | 100 | 42.3 | PVA |
| Comparative Example 5 | styrene-acrylic-based | 5.0 | phlogopite | 20-30 | 1000 | 42.3 | PVA |
| Comparative Example 6 | styrene-acrylic-based | 0.0 | phlogopite | 20-30 | 1000 | 42.3 | PVA |

| | Gas Barrier Layer | | | Performance | | |
|---|---|---|---|---|---|---|
| | Kind of Layered Inorganic Compound | Content of Layered Inorganic Compound (water-soluble resin 100 parts) | Sealant Layer Kind of Resin | Water Vapor Permeability $g/m^2 \cdot 24\,h$ | Oxygen Permeability $cc/m^2 \cdot 24\,h$ | Denseness |
| Example 20 | mica | 10 | — | 9 | 0.4 | A |
| Example 21 | mica | 10 | — | 9 | 0.4 | A |
| Example 22 | mica | 10 | — | 9 | 0.6 | A |
| Example 23 | mica | 10 | — | 7 | 0.4 | A |
| Example 24 | mica | 5.2 | — | 9 | 0.4 | A |
| Example 25 | mica | 13.4 | — | 9 | 0.4 | A |
| Example 26 | — | — | — | 38 | 1.5 | B |
| Example 27 | — | — | — | 40 | 1.2 | B |
| Example 28 | — | — | PBS | 17 | 0.8 | B |
| Comparative Example 1 | — | — | — | 93 | 11.0 | C |
| Comparative Example 2 | — | — | — | 122 | 9.3 | C |
| Comparative Example 3 | — | — | — | 95 | 11.1 | C |
| Comparative Example 4 | — | — | — | 134 | 10.6 | C |
| Comparative Example 5 | — | — | — | 120 | 7.6 | D |
| Comparative Example 6 | — | — | — | 186 | 12.1 | D |

As obvious from Table 1 and Table 2, in the case where a cationic resin was not contained, a layered inorganic compound was difficult to uniformly disperse and therefore sufficient barrier properties could not be attained (Comparative Examples 1 to 4, Comparative Example 6). In addition, when the thickness of the layered inorganic compound was large and the aspect ratio was less than 50, sufficient barrier properties could not also be attained (Comparative Example 5). On the other hand, in the case where a layered inorganic compound having a small thickness and having an aspect ratio of 50 or more was used and where a cationic resin was contained, the layered inorganic compound having a high aspect ratio dispersed uniformly, the water vapor barrier layer was excellent in denseness, and the water vapor barrier properties and the gas barrier properties thereof greatly improved (Examples 1 to 28).

Next, sealant layer-having gas barrier laminates were investigated by variously changing the sealant layer therein.

Example 29

With stirring, 278.8 parts of an anionic binder, styrene-acrylic (SA) resin emulsion (Herbil C-3) was added to 128.6 parts of an aqueous dispersion of a layered inorganic compound (swelling mica, NTO-05) and stirred. 12.7 parts of a cationic resin, modified polyamide (PA) resin (SPI203 (50)) was added thereto, and stirred. Further, 1.8 parts of an aqueous 25% ammonia was added and stirred. Further, dilution water was added to give a coating liquid for a water vapor barrier layer having a solid concentration of 28%.

An aqueous solution of a water-soluble polymer, polyvinyl alcohol (PVA, Poval PVA117) having a solid concentration of 10% was prepared to be a coating liquid for a gas barrier layer.

A water-dispersible resin, carboxy-modified polyolefin (PO) polymer emulsion (Zaikthene AC) was diluted to have a solid concentration of 20% to be a coating layer for a sealant layer.

The resultant coating liquid for a water vapor barrier layer was applied to one surface of bleached kraft paper so that the coating amount of the liquid for a water vapor barrier layer after dried could be 13 $g/m^2$, using a Mayer bar, and then dried in a hot air drying machine at 120° C. for 1 minute to form a water vapor barrier layer. Further, on the water vapor barrier layer, a coating liquid for a gas barrier layer was applied so that the coating amount of the liquid for a gas barrier layer after dried could be 2.0 $g/m^2$, using a Mayer bar, and then dried in a hot air drying machine at 120° C. for 1 minute to form a gas barrier layer. Further, on the gas barrier layer, a coating liquid for a sealant layer was applied so that the coating amount of the liquid after dried could be 10 g/m$^2$, using a Mayer bar, and then dried in a hot air drying machine at 120° C. for 1 minute to form a sealant layer, thereby giving a gas barrier laminate. The coating amount was controlled by the solid concentration in the coating liquid and by the count of the Mayer bar. A cross section of the gas barrier laminate was visually observed on an enlarged microscopic picture (electron microscopic picture) thereof, and revealed that the water vapor barrier layer formed a dense film with no void.

Example 30

A gas barrier laminate was produced in the same manner as in Example 1, except that the water-dispersible resin in the coating liquid for a sealant layer was changed to a carboxy-modified polyolefin (PO) polymer emulsion (Zaikthene L).

Example 31

A gas barrier laminate was produced in the same manner as in Example 1, except that the water-dispersible resin in the coating liquid for a sealant layer was changed to a carboxy-modified polyolefin (PO) polymer emulsion (Zaikthene N).

Example 32

A gas barrier laminate was produced in the same manner as in Example 1, except that the water-dispersible resin in the coating liquid for a sealant layer was changed to a polyolefin (PE) elastomer emulsion (Chemipearl A400).

Example 33

A gas barrier laminate was produced in the same manner as in Example 1, except that the water-dispersible resin in the coating liquid for a sealant layer was changed to a polyolefin (PE) elastomer emulsion (Chemipearl A100).

Example 34

A gas barrier laminate was produced in the same manner as in Example 1, except that the water-dispersible resin in the coating liquid for a sealant layer was changed to a polyolefin (LDPE) elastomer emulsion (Chemipearl M200).

Example 35

A gas barrier laminate was produced in the same manner as in Example 1, except that the water-dispersible resin in the coating liquid for a sealant layer was changed to an ethylene/vinyl acetate (EVA) emulsion (Chemipearl V200).

Example 36

A gas barrier laminate was produced in the same manner as in Example 1, except that the water-dispersible resin in the coating liquid for a sealant layer was changed to an ionomer (TO) emulsion (Chemipearl S200).

Example 37

A gas barrier laminate was produced in the same manner as in Example 1, except that the water-dispersible resin in the coating liquid for a sealant layer was changed to a low-molecular-weight polyolefin (PE) wax emulsion (Chemipearl W400).

Example 38

A gas barrier laminate was produced in the same manner as in Example 1, except that the water-dispersible resin in the coating liquid for a sealant layer was changed to a polylactic acid resin (PLA) emulsion (LANDY PL-3000).

Example 39

A gas barrier laminate was produced in the same manner as in Example 1, except that 278.8 pars of the anionic binder, styrene-acrylic resin emulsion in the coating liquid for a water vapor barrier layer was changed to 285.4 parts of acid-modified SBR latex (LX407S12) and 29.7 parts of acid-modified SBR latex (LX407BP-6). A cross section of the gas barrier laminate was visually observed on an enlarged microscopic picture (electron microscopic picture) thereof, and revealed that the water vapor barrier layer formed a dense film with no void.

Example 40

A gas barrier laminate was produced in the same manner as in Example 1, except that 128.6 parts of the aqueous dispersion of a layered inorganic compound (swelling mica, NTO-05) was chanted to 9.0 parts of bentonite (swelling bentonite, Kunipia F). A cross section of the gas barrier laminate was visually observed on an enlarged microscopic picture (electron microscopic picture) thereof, and revealed that the water vapor barrier layer formed a dense film with no void.

Example 41

A gas barrier laminate was produced in the same manner as in Example 1, except that 128.6 parts of the aqueous dispersion of a layered inorganic compound (swelling mica, NTO-05) was chanted to 600 parts of kaolin (BARRISURF HX). A cross section of the gas barrier laminate was visually observed on an enlarged microscopic picture (electron microscopic picture) thereof, and revealed that the water vapor barrier layer formed a porous film.

Comparative Example 7

A gas barrier laminate was produced in the same manner as in Example 1, except that a cationic resin, modified polyamide (PA) resin was not used in the coating liquid for a water vapor barrier layer and that a sealant layer was not formed.

Comparative Example 8

A barrier packaging material was produced in the same manner as in Example 1, except that the sealant layer was changed to a dry-laminate resin layer. The dry-laminate layer was formed by dry lamination with an LLDPE film.

The resultant gas barrier laminates were evaluated in point of water vapor barrier properties (water vapor permeability), gas barrier properties (oxygen permeability), disintegrability and heat sealing properties. Evaluation methods for disintegrability and heat sealing properties are as shown below.

(Disintegrability)

A sample sheet in a size of 1 cm×1 cm was cut out of the gas barrier laminate, and 8 g thereof was mixed in 500 ml of water in a mixer for household use (concentration 1.6%), and stirred for 2 minutes to prepare a pulp slurry. The pulp slurry was made into a paper sheet with a laboratory hand-made paper machine. The resultant sheet was dried, visually checked for the presence or absence of undisintegrated matters (e.g., film pieces, fiber flocs, undisintegrated pieces) in the dried sheet, and evaluated according to the following criteria. In the performance evaluation, A is judged to be good.

A: No undisintegrated matters were contained, and a uniform sheet was formed.

B: Undisintegrated matters were contained, and a uniform sheet was not formed.

(Heat Sealing Properties)

A pair of gas barrier laminates were laid over so that the sealant layers thereof could face each other, and using a heat seal tester TP-701-B (by Tester Sangyo Co., Ltd.), these were heat-sealed under the condition of 130° C., 0.5 MPa and 30 seconds, and evaluated according to the following criteria. In the performance evaluation, A and B are judged to be good.

A: The pair of barrier packaging materials were heat-sealed and strongly fused.

B: The pair of barrier packaging materials were heat-sealed and fused.

C: The pair of barrier packaging materials were not heat-sealed and were not fused.

Evaluation results of the gas barrier laminates of Examples 29 to 41 and Comparative Examples 7 and 8 are shown in Table 3.

TABLE 3

| | Water Vapor Barrier Layer | | | | |
|---|---|---|---|---|---|
| | Anionic Binder | Content of Cationic Resin (anionic binder 100 parts) part by mass | Kind of Layered Inorganic Compound | Aspect Ratio of Layered Inorganic Compound | Thickness of Layered Inorganic Compound nm | Content of Layered Inorganic Compound (anionic binder 100 parts) part by mass |
| Example 29 | styrene-acrylic-based | 4.5 | mica | 1000 | 5 | 5.1 |
| Example 30 | styrene-acrylic-based | 4.5 | mica | 1000 | 5 | 5.1 |
| Example 31 | styrene-acrylic-based | 4.5 | mica | 1000 | 5 | 5.1 |
| Example 32 | styrene-acrylic-based | 4.5 | mica | 1000 | 5 | 5.1 |
| Example 33 | styrene-acrylic-based | 4.5 | mica | 1000 | 5 | 5.1 |
| Example 34 | styrene-acrylic-based | 4.5 | mica | 1000 | 5 | 5.1 |
| Example 35 | styrene-acrylic-based | 4.5 | mica | 1000 | 5 | 5.1 |
| Example 36 | styrene-acrylic-based | 4.5 | mica | 1000 | 5 | 5.1 |
| Example 37 | styrene-acrylic-based | 4.5 | mica | 1000 | 5 | 5.1 |
| Example 38 | styrene-acrylic-based | 4.5 | mica | 1000 | 5 | 5.1 |
| Example 39 | SBR | 4.5 | mica | 1000 | 5 | 5.1 |
| Example 40 | styrene-acrylic-based | 4.5 | bentonite | 300 | 1 | 6.0 |
| Example 41 | styrene-acrylic-based | 4.5 | kaolin | 80-100 | 100 | 400.0 |
| Comparative Example 7 | styrene-acrylic-based | 0.0 | mica | 1000 | 5 | 6.0 |
| Comparative Example 8 | styrene-acrylic-based | 4.5 | kaolin | 80-100 | 100 | 20.0 |

| | Gas Barrier Layer Kind of Resin | Sealant Layer Kind of Resin | Performance | | | |
|---|---|---|---|---|---|---|
| | | | Water Vapor Permeability g/m² · 24 h | Oxygen Permeability cc/m² · 24 h | Disinittegrability | Heat Sealing Properties |
| Example 29 | PVA | PO | 10 | 1.0 | A | A |
| Example 30 | PVA | PO | 10 | 1.0 | A | A |
| Example 31 | PVA | PO | 10 | 1.0 | A | A |
| Example 32 | PVA | PE | 10 | 1.0 | A | A |
| Example 33 | PVA | PE | 10 | 1.0 | A | A |
| Example 34 | PVA | LDPE | 10 | 1.0 | A | A |
| Example 35 | PVA | EVA | 10 | 1.0 | A | A |
| Example 36 | PVA | IO | 10 | 1.0 | A | A |
| Example 37 | PVA | PE | 10 | 1.0 | A | A |
| Example 38 | PVA | PLA | 10 | 1.0 | A | A |

TABLE 3-continued

| | | | | | | |
|---|---|---|---|---|---|---|
| Example 39 | PVA | PO | 20 | 5.0 | A | A |
| Example 40 | PVA | PO | 10 | 1.0 | A | A |
| Example 41 | PVA | PO | 30 | 10.0 | A | B |
| Comparative Example 7 | PVA | — | 70 | 10.0 | A | C |
| Comparative Example 8 | PVA | LLDPE | 10 | 1.0 | B | B |

As obvious from Table 3, in the gas barrier laminates of Examples 29 to 41, the water vapor barrier layer contained a specified layered inorganic compound and a cationic resin and the sealant layer contained a water-dispersible resin, and therefore these gas barrier laminates were excellent in water vapor barrier properties, gas barrier properties, disintegrability and heat sealing properties.

The gas barrier laminate of Comparative Example 7 did not have a heat sealing layer and was therefore inferior in heat sealing properties. In the gas barrier laminate of Comparative Example 8, the sealant layer was formed of a dry laminate resin layer and therefore the gas barrier laminate was inferior in disintegrability.

The invention claimed is:

1. A gas barrier laminate having a water vapor barrier layer and a gas barrier layer in that order on at least one surface of a paper support, wherein:
    the water vapor barrier layer comprises a layered inorganic compound, a cationic resin and an anionic binder,
    the aspect ratio of the layered inorganic compound is 80 or more,
    the thickness of the layered inorganic compound is 100 nm or less,
    the content of the layered inorganic compound is 1 to 50 parts by mass relative to 100 parts by mass of the anionic binder,
    the gas barrier layer comprises a water-soluble polymer, and
    the layered inorganic compound is at least one selected from the group consisting of mica and bentonite.

2. The gas barrier laminate according to claim 1, wherein the anionic binder is at least one selected from the group consisting of a styrene-butadiene copolymer, a styrene-acrylic copolymer, and an olefin-unsaturated carboxylic acid copolymer.

3. The gas barrier laminate according to claim 1, wherein the surface charge of the cationic resin is 0.1 to 10 meq/g.

4. The gas barrier laminate according to claim 1, wherein the water-soluble polymer is a polyvinyl alcohol or a modified polyvinyl alcohol.

5. The gas barrier laminate according to claim 1, wherein the gas barrier layer comprises a layered inorganic compound that has the aspect ratio of 80 or more and the thickness of 100 nm or less.

6. The gas barrier laminate according to claim 1, further having a sealant layer as at least one outermost layer.

7. The gas barrier laminate according to claim 6, wherein the sealant layer comprises a water-dispersible resin.

8. The gas barrier laminate according to claim 1, which is a packaging material.

9. The gas barrier laminate according to claim 1, wherein the content of the layered inorganic compound is 1 to 42.3 parts by mass relative to 100 parts by mass of the anionic binder.

10. The gas barrier laminate according to claim 1, wherein the aspect ratio of the layered inorganic compound is 300 or more.

* * * * *